United States Patent
Kuramoto et al.

(10) Patent No.: US 10,308,139 B2
(45) Date of Patent: Jun. 4, 2019

(54) VEHICLE MANAGEMENT METHOD AND VEHICLE MANAGEMENT DEVICE

(71) Applicant: Nissan Motor Co., Ltd., Yokohama-shi, Kanagawa (JP)

(72) Inventors: Yoh Kuramoto, Kanagawa (JP); Isamu Kazama, Kanagawa (JP); Naoki Yamamoto, Kanagawa (JP); Daisuke Hatakenaka, Kanagawa (JP); Yoshiharu Tsuruoka, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/749,924

(22) PCT Filed: Sep. 3, 2015

(86) PCT No.: PCT/JP2015/075052
§ 371 (c)(1),
(2) Date: Feb. 2, 2018

(87) PCT Pub. No.: WO2017/037911
PCT Pub. Date: Mar. 9, 2017

(65) Prior Publication Data
US 2018/0229608 A1 Aug. 16, 2018

(51) Int. Cl.
*B60L 53/10* (2019.01)
*B60L 3/00* (2019.01)
(Continued)

(52) U.S. Cl.
CPC ............ *B60L 53/65* (2019.02); *B60L 3/0046* (2013.01); *B60L 53/10* (2019.02); *B60L 53/60* (2019.02);
(Continued)

(58) Field of Classification Search
CPC .. B60L 3/0046; B60L 11/1862; B60L 11/187; B60L 53/65; B60L 53/10;
(Continued)

(56) References Cited

U.S. PATENT DOCUMENTS 8,102,248 B2 * 1/2012 Yasuda et al. .......... B60L 53/65
701/22
8,509,976 B2 * 8/2013 Kempton et al. ....... B60L 53/65
701/22
(Continued)

FOREIGN PATENT DOCUMENTS

CN 1667623 A 9/2005
CN 101549686 A 10/2009
(Continued)

OTHER PUBLICATIONS

Espacenet translation of KR20110132134A, Kim, 9 pages (Year: 2011).*

*Primary Examiner* — Dale W Hilgendorf
(74) *Attorney, Agent, or Firm* — Global IP Counselors, LLP (57) ABSTRACT

A vehicle management method is provided for managing an electric vehicle by using a management server based on vehicle-specific ID information that defines a condition of use transmitted from an onboard controller. The vehicle management method includes acquiring vehicle ID information from the electric vehicle by using the management server; determining the vehicle ID information to be valid if the vehicle ID information acquired falls within a use period set in advance and determining the vehicle ID information to be invalid if the vehicle ID information acquired falls outside a use period set in advance; and applying a prescribed limitation to charging of a battery of the electric
(Continued)

vehicle having the vehicle ID information upon determining that the vehicle ID information is invalid.

9 Claims, 4 Drawing Sheets (51) Int. Cl.
| | | |
|---|---|---|
| *B60K 1/00* | (2006.01) | |
| *B60L 53/60* | (2019.01) | |
| *B60L 53/65* | (2019.01) | |
| *B60L 53/66* | (2019.01) | |
| *B60L 58/12* | (2019.01) | |
| *B60L 58/13* | (2019.01) | |
| *B60L 58/15* | (2019.01) | |
| *B60L 58/24* | (2019.01) | |
| *B60L 53/14* | (2019.01) | |
| *B60L 58/14* | (2019.01) | |
| *B60L 58/27* | (2019.01) | |
| *G06Q 30/06* | (2012.01) | |
| *G06Q 50/10* | (2012.01) | |

(52) U.S. Cl.
CPC .............. *B60L 53/66* (2019.02); *B60L 58/12* (2019.02); *B60L 58/13* (2019.02); *B60L 58/15* (2019.02); *B60K 2001/008* (2013.01); *B60K 2350/1056* (2013.01); *B60L 53/11* (2019.02); *B60L 53/14* (2019.02); *B60L 53/665* (2019.02); *B60L 58/14* (2019.02); *B60L 58/24* (2019.02); *B60L 58/27* (2019.02); *B60L 2240/54* (2013.01); *B60L 2240/545* (2013.01); *G06Q 30/06* (2013.01); *G06Q 50/10* (2013.01); *Y02T 10/7005* (2013.01); *Y02T 90/168* (2013.01); *Y04S 30/12* (2013.01)

(58) Field of Classification Search
CPC .......... B60L 58/15; B60L 58/12; B60L 53/66; B60L 53/60; B60L 58/13; B60L 58/24; B60K 2001/008; B60K 2350/1056
See application file for complete search history.

(56) References Cited

U.S. PATENT DOCUMENTS

| | | | |
|---|---|---|---|
| 9,751,423 B2 | 9/2017 | Niioka et al. | |
| 2012/0049785 A1* | 3/2012 | Tanaka | B60L 3/0046 320/106 |
| 2012/0319648 A1 | 12/2012 | Ohtomo | |
| 2013/0110296 A1* | 5/2013 | Khoo et al. | B60L 11/1825 700/286 |
| 2013/0278225 A1* | 10/2013 | Dietze et al. | B60L 11/1862 320/137 |
| 2014/0316630 A1 | 10/2014 | Kohlberger et al. | |

FOREIGN PATENT DOCUMENTS

| | | | | |
|---|---|---|---|---|
| CN | 101751721 A | | 6/2010 | |
| CN | 104467079 A | | 3/2015 | |
| CN | 104702589 A | | 6/2015 | |
| JP | 2003-253936 A | | 9/2003 | |
| JP | 2012-25211 A | | 2/2012 | |
| JP | 2012-27594 A | | 2/2012 | |
| KR | 20110132134 A | * | 12/2011 | ............ G06Q 50/30 |
| KR | 10-2015-0089171 A | | 8/2015 | |
| RU | 149860 U1 | | 1/2015 | |
| WO | 2013/057587 A2 | | 4/2013 | |
| WO | 2014/045776 A1 | | 3/2014 | |

* cited by examiner

VEHICLE MANAGEMENT METHOD AND VEHICLE MANAGEMENT DEVICE

CROSS-REFERENCE TO RELATED APPLICATIONS

This application is a U.S. National stage application of International Application No. PCT/JP2015/075052, filed Sep. 3, 2015.

BACKGROUND

Field of the Invention

The present invention relates to a vehicle management method and a vehicle management device that manage an electric vehicle based on vehicle-specific ID information that defines a condition of use.

Background Information

Conventionally, a vehicle management method is known in which, in vehicle management with regard to a car lease, rental car, etc., in which a vehicle to be managed is lent to a plurality of users, an electronic key that is used as a keyless entry device for a vehicle is utilized, and the electronic key issued sets use conditions in advance for lending a vehicle to a user, such as a use condition in which the lending of the vehicle is permitted only during a predetermined contract period, and the locking/unlocking of the door lock of the rental car is carried out using this electronic key (for example, see Japanese Laid-Open Patent Application No. 2003-253936, which is herein referred to as Patent Document 1).

SUMMARY

In the conventional vehicle management method, when the contract period expires and the electronic key becomes invalid to thereby invalidate the permission of lending, it becomes impossible to unlock the lock of the door lock of the rental car. That is, access to the vehicle becomes impossible once the contract period expires. Consequently, if the rental car is an electric vehicle, when the electronic key becomes invalid and access to the rental car becomes impossible, and assuming the rental car is left in a state of insufficient charge, there is the problem that adverse effects could occur, such as the onboard battery becoming overdischarged.

In light of the problems described above, an object of the present invention is to provide a vehicle management method and a vehicle management device that can prevent adverse effects in a battery while applying a prescribed limitation to the use of the vehicle, once the set condition of use fall outside the application range and the use permission of the vehicle becomes invalid.

In order to achieve the object described above, the present invention is a vehicle management method for managing electric vehicles based on vehicle-specific ID information that defines a condition of use. First, the vehicle ID information is acquired from an electric vehicle. Next, determining whether or not the ID information is invalid based on the condition of use of the acquired ID information. Then, if upon determined that this ID information is invalid, the prescribed limitation is applied to the charging of the battery of the electric vehicle having said ID information.

Therefore, according to the present invention, if a use condition violation occurs and the ID information becomes invalid, a prescribed limitation is imposed on the charging so that it becomes impossible to carry out unlimited charging. Accordingly, it is possible to set certain limitations to the use of the vehicle. On the other hand, since charging is possible within the range of limitations, it is possible to prevent adverse effects such as overdischarge and freezing of the battery. As a result, it is possible to prevent adverse effects in the battery while applying a prescribed limitation on the use of the vehicle, once the use permission of the vehicle becomes invalid.

DETAILED DESCRIPTION OF THE EMBODIMENTS

Embodiments for implementing the vehicle management method and the vehicle management device of the present invention will be described below, based on the first embodiment illustrated in the drawings.

First Embodiment 1

First, the "overall system configuration" and the "configuration of the vehicle management process" will be separately described regarding the configuration of the vehicle management device of the first embodiment.

Overall System Configuration

Figure 1:
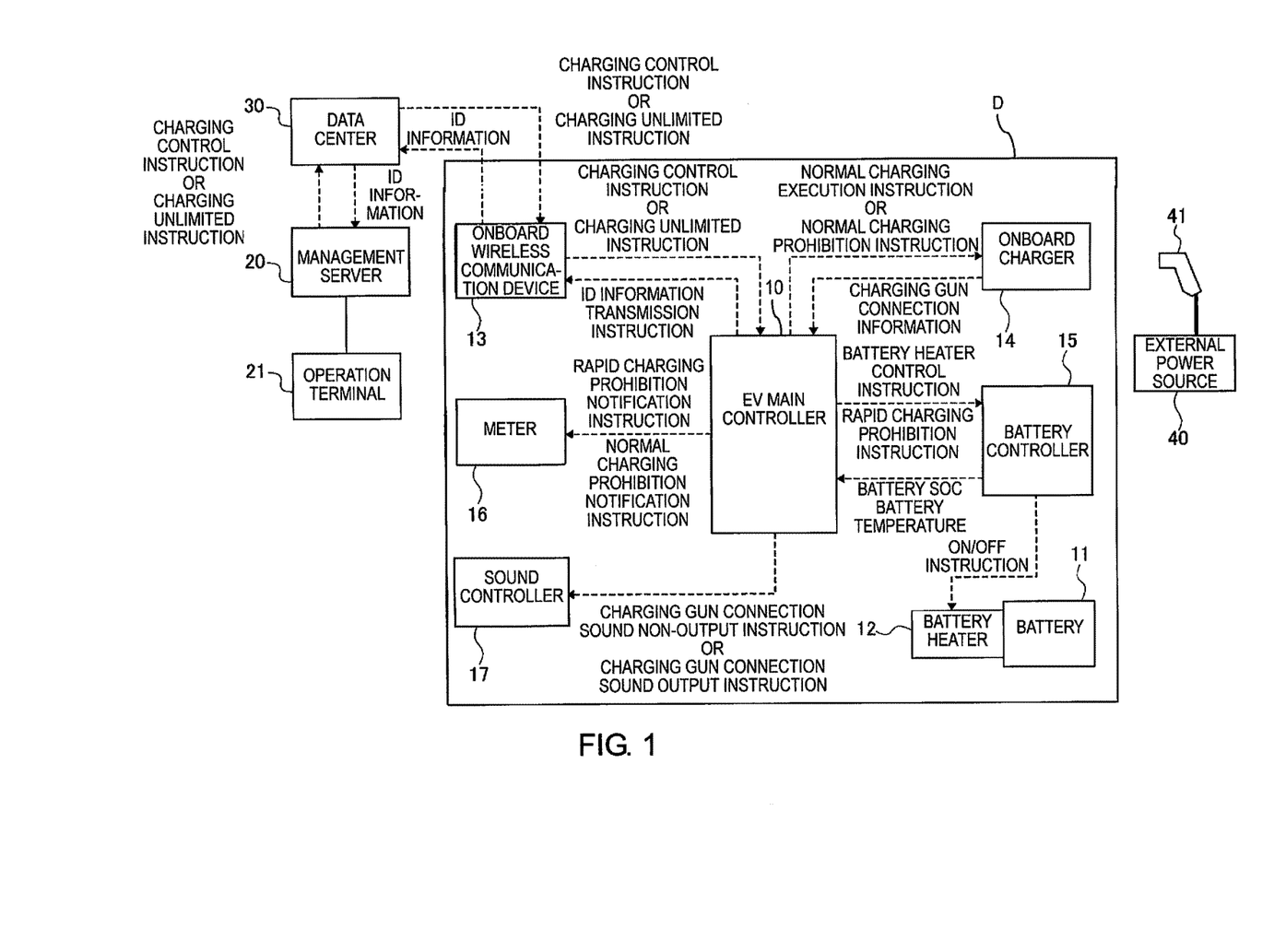
FIG. 1 is an overall system view illustrating the vehicle management device of the first embodiment.

FIG. 1 is an overall system view illustrating the vehicle management device of the first embodiment. The overall system configuration of the embodiment will be described below based on FIG. 1.

The vehicle management device of the first embodiment comprises an EV main controller 10 (onboard controller), a management server 20 and a data center 30.

The EV main controller 10 described above is mounted in an electric vehicle D, and has the function to control the start/end of charging of a battery 11 provided to this electric vehicle D, to control the charging power and to control the operation state of a battery heater 12. In addition, this EV main controller 10 carries out a transmission control of the ID information of the host vehicle, an announcement control of a charging prohibition state, and an output control of a charging gun connection sound.

The electric vehicle D is a car whose conditions of use are set by means of a contract, such as with rental cars and leased vehicles, and whose use is permitted if these conditions of use are satisfied. Then, this electric vehicle D comprises ID information, which is vehicle-specific identification information allocated to each vehicle. A use period, which is a use condition of the electric vehicle D, is set in this ID information. That is, if it falls within the use period set in the ID information, the ID information is determined to be valid and the use of the electric vehicle D is permitted, and if it falls outside the use period, the ID information is determined to be invalid and the use of the electric vehicle D is limited. In addition, the battery 11 is a secondary battery having a charging and discharging function, and serves as a power source of a motor (not shown) as the traveling drive source of the electric vehicle D. This battery 11 is charged by charging power from an external power source 40, or by regenerative power from the motor, which is not shown. Here, examples of charging methods by the external power source 40 include rapid charging and normal charging. "Rapid charging" is a charging method that, for example, uses a three-phase 200V power source and charges at an output of 50 kW, and with which it is possible to achieve a full charge in a relatively short period of time. On the other hand, "normal charging" is a charging method in which charging entails use of a commonly used single-phase alternating current 200V or 100V, and with which it takes a relatively long period of time to achieve a full charge. The battery heater 12 is a PTC heater having a function to heat the battery 11. This battery heater 12 is driven using the charging power from the external power source 40 (hereinafter referred to as "external power") or the stored power of the battery 11 (hereinafter referred to as "battery power"), based on an ON/OFF instruction from the battery controller 15.

Then, in this EV main controller 10, connection information of a charging gun 41 is input from an onboard charger 14, and a charging control instruction or charging unlimited instruction is input from an onboard wireless communication device 13. Then, when the charging gun connection information is input, an instruction to transmit the ID information of the host vehicle is output to the onboard wireless communication device 13. In addition, when a charging control instruction is input, a rapid charging prohibition instruction is output to the battery controller 15, a rapid charging prohibition notification instruction is output to a meter 16, a charging gun connection sound non-output instruction is output to a sound controller 17, and a charging power amount limit threshold value at the time of normal charging is set. Additionally, when a charging unlimited instruction is input, a charging gun connection sound output instruction is output to the sound controller 17. Additionally, in this EV main controller 10, the remaining charging amount of the battery 11 (hereinafter referred to as "battery SOC") and the temperature of the battery 11 (hereinafter referred to as "battery temperature") are input from the battery controller 15. Then, if the charging control instruction is being input, a normal charging execution instruction or a normal charging prohibition instruction is output to the onboard charger 14 according to the battery SOC. In addition, a battery heater control instruction is output to the battery controller 15. Furthermore, when a normal charging prohibition instruction is output to the onboard charger 14, a normal charging prohibition notification instruction is output to the meter 16. Furthermore, when a charging control instruction is input, this EV main controller 10 acquires connection information of the charging gun 41 from the onboard charger 14 and outputs a battery heater control instruction to the battery controller 15 according to the acquired connection information of the charging gun 41. When a charging unlimited instruction is input, a battery heater control instruction based on the battery temperature is output to the battery controller 15.

The onboard wireless communication device 13 is mounted on an electric vehicle D and has a function to wirelessly communicate with the management server 20 via the data center 30. When an ID information transmission instruction is input from the EV main controller 10, the onboard wireless communication device 13 transmits the ID information of the host vehicle to the management server 20 via the data center 30. In addition, when a charging control instruction or a charging unlimited instruction is received from the management server 20 via the data center 30, a charging control instruction or a charging unlimited instruction is output to the EV main controller 10.

The onboard charger 14 is mounted on the electric vehicle D and has a function to convert the alternating current charging power from the external power source 40 into a direct current electric power and charge the battery 11. In addition, this onboard charger 14 detects the connection state of the charging gun 41, which carries out the supply of electric power from the external power source 40 to the electric vehicle D and outputs the connection state to the EV main controller 10 as charging gun connection information. Furthermore, this onboard charger 14 executes normal charging from the external power source 40 to the battery 11 when a normal charging execution instruction is input from the EV main controller 10 and prohibits normal charging from the external power source 40 to the battery 11 when a normal charging prohibition instruction is input.

The battery controller 15 is mounted on an electric vehicle D and monitors the battery SOC and the battery temperature, and has a function to output an ON/OFF instruction to the battery heater 12. In addition, this battery controller 15 outputs the detected battery SOC information and the battery temperature information to the EV main controller 10. Furthermore, when a rapid charging prohibition instruction is input from the EV main controller 10, this battery controller 15 prohibits rapid charging from the external power source 40 to the battery 11.

The meter 16 is installed in the cabin interior of the electric vehicle D, and has a function to display the vehicle speed and to display the charging prohibition state from the external power source 40 to the battery 11. This meter 16 displays a rapid charging prohibition state when a rapid charging prohibition notification instruction is input from the EV main controller 10 and a normal charging prohibition state when a normal charging prohibition notification instruction is input.

The sound controller 17 is mounted on an electric vehicle D, and has a function to generate sounds corresponding to situations that are set in advance and to output the sounds at predetermined timings. When a charging gun connection sound non-output instruction is input from the EV main controller 10, this sound controller 17 does not output a charging gun connection sound (connection notification sound), which notifies that a charging gun 41 has been connected to the electric vehicle D. In addition, when a charging gun connection sound output instruction is input from the EV main controller 10, the sound controller outputs a charging gun connection sound.

The management server 20 is a server for managing the use of the electric vehicle D and is installed on the outside of the electric vehicle D. This management server 20 has a function to carry out individual charging control operations for a plurality of electric vehicles D. When ID information transmitted from the electric vehicle D is received via the data center 30, the validity of the use period of the received ID information is determined. If determining that the ID information has expired, the ID information is regarded as invalid, and a charging control instruction is output to the electric vehicle D that transmitted this ID information.

This "charging control instruction" includes the following points.

Prohibit rapid charging

Set an upper limit value (limit threshold value) of the battery SOC when carrying out normal charging (here, 40%)

Drive the battery heater 12 using the external power while executing normal charging Stop driving the battery heater 12 when the execution of normal charging is prohibited Drive the battery heater 12 using battery power when the charging gun 41 is disconnected while executing normal charging An operation terminal 21 is connected to this management server 20, and the manager of the electric vehicle D inputs and output necessary information by operating this operation terminal 21.

In addition, when determining that the ID information falls within the use period, the ID information is regarded as valid, and a charging unlimited instruction is output to the electric vehicle D that transmitted this ID information.

The data center 30 is interposed between the management server 20 and a plurality of electric vehicles D and has a function to manage the transmission and reception of various information. The information that is output from the electric vehicle D to the management server 20 (ID information) is temporarily received by the data center 30 and is transmitted to the management server 20 via this data center 30. In addition, the information that is output from the management server 20 (charging control instruction or charging unlimited instruction) is temporarily received by the data center 30 and is transmitted to the electric vehicle D via this data center 30.

The external power source 40 is a rapid charger capable of rapid charging or a household power source capable only of normal charging. The external power source 40 comprises a charging gun 41 that can be connected to/disconnected from a charging port, which is not shown, provided to the electric vehicle D. Then, when the charging gun 41 is connected to the charging port, it is possible to supply electric power from the external power source 40 via this charging gun 41 and the charging port.

Configuration of the Vehicle Management Process

Figure 2A:
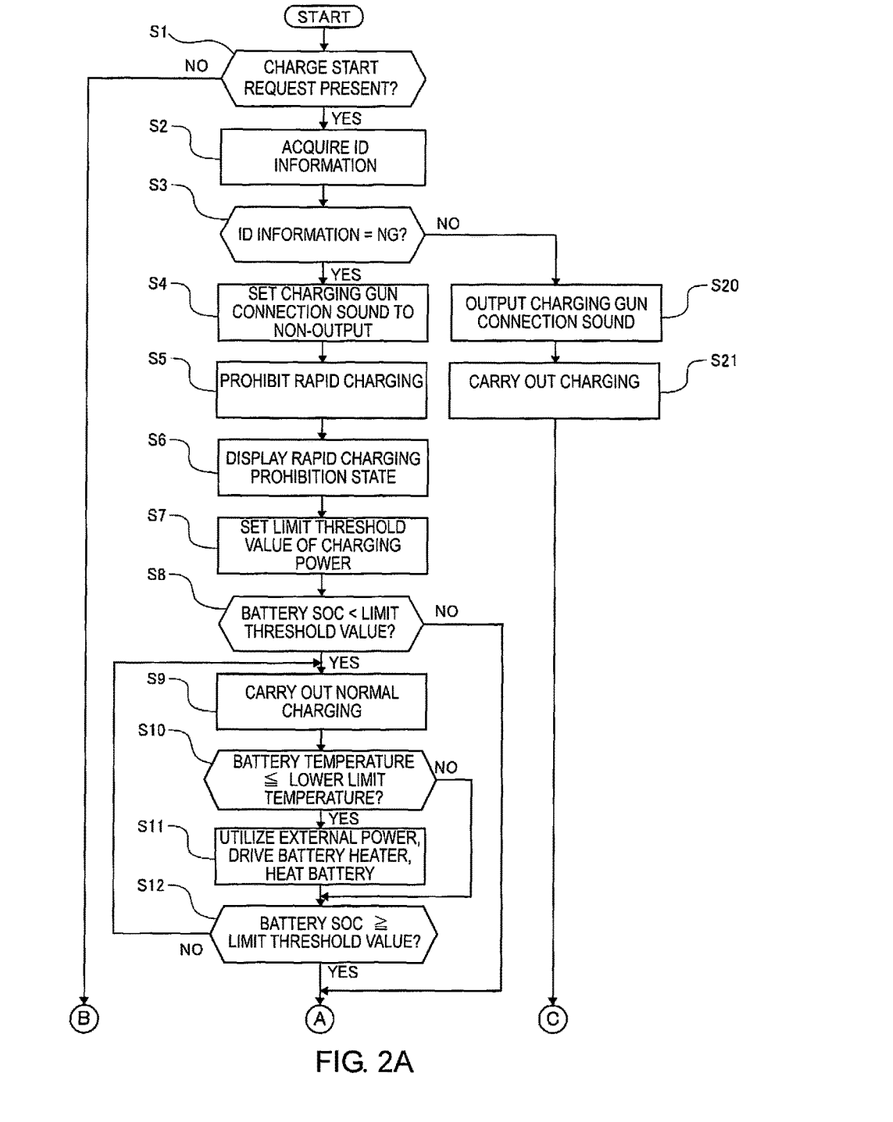
FIG. 2A is a flowchart illustrating the flow of a vehicle management process that is executed in the first embodiment, showing Steps S1-S12 and Steps S20-S21.
Figure 2B:
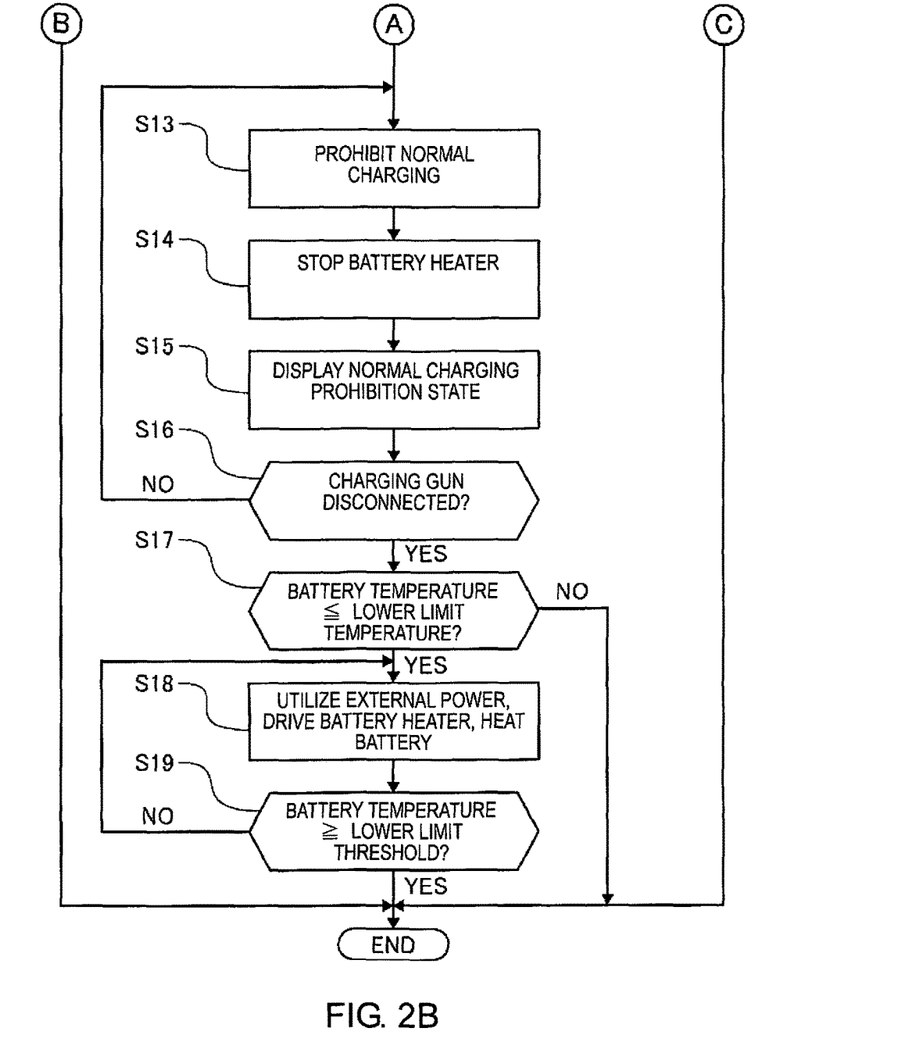
FIG. 2B is a flowchart illustrating the flow of a vehicle management process that is executed in the first embodiment, showing Steps S13-S19.

FIG. 2A and FIG. 2B are flowcharts illustrating the flow of the configuration of the vehicle management process that is executed in the first embodiment. The configuration of the vehicle management process of the first embodiment will be described below, based on FIG. 2A and FIG. 2B.

In Step S1, it is determined whether or not a charge start request has occurred in the EV main controller 10 mounted on the electric vehicle D. In the case of YES (charge start request present), the process proceeds to Step S2, and if NO (charge start request absent), the process proceeds to END (refer to FIG. 2B). Here, a charge start request occurs by means of a charging gun 41 of the external power source 40 in a disconnected state being connected to the electric vehicle D. The connection state of the charging gun 41 is detected by the onboard charger 14.

In Step S2, following the determination that a charge start request is present in Step S1, an ID information transmission instruction is output from the EV main controller 10 to the onboard wireless communication device 13, and the ID information is transmitted from this onboard wireless communication device 13 to the management server 20 via the data center 30. The management server 20 thereby acquires the ID information, and the process proceeds to Step S3.

In Step S3, following the acquisition of the ID information in Step S2, it is determined whether or not the acquired ID information is invalid in the management server 20. If YES (ID information=NG), the process proceeds to Step S4. If NO (ID information=OK), the process proceeds to Step S20. Here, the determination of invalidity of the ID information is made from the use period of the ID information set based on a contract that is set for each electric vehicle D. That is, the ID information is valid if it falls within the use period, and the ID information is invalid if it falls outside the use period (before the use period or past the use period).

In Step S4, following the determination that ID information=NG in Step S3, a charging control instruction is output from the management server 20. This charging control instruction is transmitted to the onboard wireless communication device 13 via the data center 30, and is output from this onboard wireless communication device 13 to the EV main controller 10. Then, in the EV main controller 10, in order to limit the use of the electric vehicle D, first, a charging gun connection sound non-output instruction is output, and in the sound controller 17, to which this charging gun connection sound non-output instruction is input, the charging gun connection sound is set to non-output, and the process proceeds to Step S5.

In Step S5, following the non-output of the charging gun connection sound in Step S4, a rapid charging prohibition instruction is output from the EV main controller 10, and in the battery controller 15 to which this rapid charging prohibition instruction is input rapid charging by the external power source 40 is prohibited, and the process proceeds to Step S6. As a result, when the external power source 40 is a rapid charger, charging from this external power source 40 is prohibited.

In Step S6, following the prohibition of rapid charging in Step S5, a rapid charging prohibition notification instruction is output from the EV main controller 10, and in the meter 16 to which this rapid charging prohibition notification instruction is input a rapid charging prohibition state is displayed, and the process proceeds to Step S7.

In Step S7, following the display of the rapid charging prohibition state in Step S6, a limit threshold value of the charging power during normal charging (upper limit value of the battery SOC during charging) is set in the EV main controller 10, and the process proceeds to Step S8.

In Step S8, following the setting of the limit threshold value in Step S7, it is determined in the EV main controller 10 whether or not the battery SOC is less than the limit threshold value set in Step S7. If YES (battery SOC<limit threshold value), normal charging is considered possible, and the process proceeds to Step S9. If NO (battery SOC≥limit threshold value), normal charging is considered impossible, and the process proceeds to Step S13. Here, the battery SOC is detected by the battery controller 15.

In Step S9, following the determination that battery SOC<limit threshold value in Step S8, normal charging is executed, and the process proceeds to Step S10. Here, normal charging is executed when the external power source 40 is a household power source, and the AC charging power supplied from this external power source 40 is converted to direct current by the onboard charger 14 to charge the battery 11.

In Step S10, following the execution of normal charging in Step S9, it is determined whether or not the battery temperature is equal to or less than a lower limit temperature that is set in advance in the EV main controller 10. In the case of YES (battery temperature≤lower limit temperature), it is deemed necessary to heat the battery 11, and the process proceeds to Step S11. In the case of NO (battery temperature>lower limit temperature), it is deemed unnecessary to heat the battery 11, and the process proceeds to Step S12. Here, the battery temperature is detected by the battery controller 15. In addition, the "lower limit temperature" is the limit temperature at which the battery 11 is capable of normal operation and is determined by the type, capacity, shape, and the like of the battery 11.

In Step S11, following the determination that battery temperature≤lower limit temperature in Step S10, a battery heater control instruction for driving the battery heater 12 using the external power is output from the EV main controller 10, and in the battery controller 15 to which this battery heater control instruction is input an ON instruction using the external power is output to the battery heater 12, and the process proceeds to Step S12. The battery heater 12 is thereby driven using the external power to heat the battery 11.

In Step S12, following the determination that battery temperature>lower limit temperature in Step S10, or the driving of the battery heater 12 in Step S11, it is determined whether or not the battery SOC is equal to or greater than the limit threshold value set in Step S7 in the EV main controller 10. If YES (battery SOC≥limit threshold value), normal charging is considered impossible, and the process proceeds to Step S13 as illustrated in FIG. 2B. If NO (battery SOC<limit threshold value), normal charging is considered possible, and the process proceeds to Step S9.

In Step S13, following the determination that battery SOC≥limit threshold value in Step S12, a normal charging prohibition instruction is output from the EV main controller 10, and in the onboard charger 14 to which this normal charging prohibition instruction is input normal charging by the external power source 40 is prohibited, and the process proceeds to Step S14. Charging from the external power source 40, which is a household power source, is thereby prohibited.

In Step S14, following the prohibition of normal charging in Step S13, a battery heater control instruction for stopping the battery heater 12 is output from the EV main controller 10, and in the battery controller 15 to which this battery heater control instruction is input an OFF instruction is output to the battery heater 12, and the process proceeds to Step S15. The battery heater 12 is thereby stopped.

In Step S15, following the stopping of the battery heater in Step S14, a normal charging prohibition notification instruction is output from the EV main controller 10, and in the meter 16 to which this normal charging prohibition notification instruction is input a normal charging prohibition state is displayed, and the process proceeds to Step S16.

In Step S16, following the display of the normal charging prohibition state in Step S15, it is determined whether or not the charging gun 41 is in a disconnected state with respect to the electric vehicle D in the EV main controller 10. In the case of YES (charging gun disconnected), the process proceeds to Step S17, and if NO (charging gun connected), the process returns to Step S13.

In Step S17, following the determination that the charging gun is disconnected in Step S16, it is determined whether or not the battery temperature is equal to or less than a lower limit temperature that is set in advance in the EV main controller 10. In the case of YES (battery temperature≤lower limit temperature), it is deemed necessary to heat the battery 11, and the process proceeds to Step S18. In the case of NO (battery temperature>lower limit temperature), it is deemed unnecessary to heat the battery 11, and the process proceeds to END.

In Step S18, following the determination that battery temperature≤lower limit temperature in Step S17, a battery heater control instruction for driving the battery heater 12 using the stored power from the battery 11 is output from the EV main controller 10, and in the battery controller 15 to which this battery heater control instruction is input, an ON instruction using the stored power is output to the battery heater 12, and the process proceeds to Step S19. As a result, the battery heater 12 is driven using the stored power stored in the battery 11 to heat the battery 11.

In Step S19, following the driving of the battery heater 12 in Step S18 it is determined whether or not the battery temperature has exceeded the lower limit temperature that is set in advance in the EV main controller 10. In the case of YES (battery temperature>lower limit temperature), it is determined that the battery 11 is sufficiently heated, and the process proceeds to END. In the case of NO (battery temperature≤lower limit temperature), it is deemed necessary to heat the battery 11, and the process returns to Step S18.

In Step S20, following the determination that ID information=OK in Step S3, a charging unlimited instruction is output from the management server 20. This charging unlimited instruction is transmitted to the onboard wireless communication device 13 via the data center 30 and is output from this onboard wireless communication device 13 to the EV main controller 10. Then, in the EV main controller 10, it is determined that charging of the electric vehicle D is not limited, and first, a charging gun connection sound output instruction is output, and in the sound controller 17, to which this charging gun connection sound output instruction is input, the charging gun connection sound is output, and the process proceeds to Step S21.

In Step S21, following the output of the charging gun connection sound in Step S20, charging from the external power source 40 to the battery 11 is carried out, and the process proceeds to END (refer to FIG. 2B). Here, rapid charging is carried out if the external power source 40 is a rapid charger, and normal charging is carried out if the external power source 40 is a household power source. In addition, if the battery temperature is equal to or less than the lower limit temperature, the external power is used to drive the battery heater 12 to heat the battery 11 while the charging gun 41 is connected. In addition, if the battery temperature is equal to or less than the lower limit temperature when the charging gun 41 is disconnected, the battery power is used to drive the battery heater 12 to heat the battery 11.

Next, the actions are described. First, the "management method for an electric vehicle and problems of the Comparative Example" is described, and then the "vehicle management action" of the vehicle management device according to the first embodiment will be described.

Management Method for an Electric Vehicle and Problems of the Comparative Example With rental cars and leased vehicles, conditions of use such as the use period are set by means of a contract between the user and the manager of the vehicle, and the ID information allocated to each vehicle becomes valid and use by the user is permitted by the user satisfying necessary requirements, such as payment of fees. Here, if the rental car, etc. is an electric vehicle, a vehicle management method is conceivable in which, when a breach of contract occurs, such as the passing of the use period or nonpayment of fees, the ID information is deemed invalid and charging is prohibited by the manager to prohibit further use of the vehicle.

"Prohibition of charging" may be achieved by prohibiting the unlocking of the door lock by disabling the electronic key or not accepting the charging of the battery.

On the other hand, electric vehicles have functions that must be implemented from the point of view of system protection. A specific example is a battery heating function for preventing the battery from freezing when the battery mounted on the electric vehicle is at a low temperature, that is, maintaining the battery temperature at or above a set temperature by driving a battery heater. Here, if charging is completely prohibited, heating the battery by driving a battery heater using an external power when a charging gun is connected is also prohibited. In other words, if charging is prohibited, a system protection function that is executed at the same time as charging will also be prohibited. Consequently, it is conceivable that freezing, etc. will occur in the battery to cause a malfunction.

In addition, in the case that unlocking of the door lock of the electric vehicle is prohibited, it becomes impossible even to move the vehicle. Consequently, there is the risk that the vehicle will be left unattended, the battery will self-discharge to an overdischarged state, and the battery will be damaged.

Vehicle Management Action

In the vehicle management device according to the first embodiment, when the charging gun 41 is connected to the electric vehicle D and a charge start request is generated, the process proceeds from Step S1→Step S2 in the flowchart illustrated in FIG. 2A, and ID information is transmitted from the electric vehicle D to the management server 20. Then, in the management server 20, it is determined whether or not the transmitted ID information is invalid, and if a breach of contract has occurred, such as the passing of the use period, the ID information is deemed invalid, and the process proceeds from Step S3→Step S4→Step S5→Step S6→Step S7. As a result, a charging gun connection sound for notifying that a charging gun 41 has been connected is set to non-output even though a charging gun 41 is connected, and the charging gun connection sound is not output. In addition, rapid charging is prohibited, and the rapid charging prohibition state is displayed on the meter 16. Furthermore, a limit threshold value of the charging power at the time of normal charging is set.

In this manner, unlike a case in which a charging gun connection sound is generated when the charging gun 41 is normally connected, by setting the charging gun connection sound to non-output a normal notification of a connected state of the charging gun 41 is not issued, and discomfort can be imparted to the user. As a result, it is possible to notify the user that charging to the battery 11 is limited to a certain extent at an early stage. In addition, through the prohibition of rapid charging, it becomes impossible to carry out a sufficient charge in a short period of time, and charging of the battery 11 will be limited to a certain extent. On the other hand, since execution of normal charging is not prohibited, for example, if normal charging is carried out, it is possible to prevent the battery 11 from freezing. Additionally, since access to the electric vehicle D is not prohibited, it is possible to prevent the electric vehicle D from being left unattended without being moved and to prevent an overdischarge of the battery 11 due to self-discharge. Furthermore, since the rapid charging prohibition state is displayed on the meter 16, it is possible to notify the user of the rapid charging prohibition state via this meter 16. As a result, the user of the electric vehicle D can grasp the fact that rapid charging is prohibited and promptly take an action to cancel the state in which charging is limited to a certain extent.

Then, when a limit threshold value of the charging power is set, the process proceeds to Step S8, and it is determined whether or not the battery SOC detected by the battery controller 15 is less than the set limit threshold value. Then, if the battery SOC is less than the limit threshold value, execution of normal charging is determined to be possible, and the process proceeds to Step S9 to carry out normal charging. In this case, it is assumed that the external power source 40 is a household power source.

When normal charging is carried out, the process proceeds to Step S10, and it is determined whether or not the battery temperature is equal to or less than a lower limit temperature that is set in advance. If the battery temperature is equal to or less than the lower limit temperature it is deemed necessary to heat the battery, the process proceeds to Step S11, and the external power is used to drive the battery heater 12 to heat the battery 11. As a result, it is possible to implement the system protection function of heating the battery 11, and it becomes possible to prevent the battery 11 from freezing and to prevent an occurrence of a malfunction in the battery 11.

Then, when the battery SOC reaches the limit threshold value, the process proceeds from Step S12 to Step S13 as shown in FIG. 2B to prohibit normal charging. As a result, supply of electric power from the external power source 40 is prohibited, and charging of the battery 11 is stopped. In this manner, by limiting the charging power to the limit threshold value, the user of the electric vehicle D cannot carry out charging until a full charge and is not able to continuously use the electric vehicle D for a long period of time. Accordingly, although the use of the electric vehicle D is not prohibited the user is limited from freely using the electric vehicle D, and it becomes possible to limit the use of the electric vehicle D to a certain extent.

Then, when normal charging is prohibited, the process proceeds from Step S14→Step S15, the driving of the battery heater 12 using the external power is stopped, and the normal charging prohibition state is displayed on the meter 16. As a result, the user can grasp the fact that normal charging is prohibited and promptly take an action to cancel the state in which charging is limited to a certain extent.

Then, even if the driving of the battery heater 12 is stopped by the prohibition of normal charging, if the charging gun 41 is disconnected from the electric vehicle D the process proceeds from Step S16→Step S17, and the battery heater 12 is driven using the stored power stored in the battery 11 to heat the battery 11 by repeating the flow of Step S18→Step S19 while the battery temperature is below the lower limit temperature. As a result, even if charging is prohibited it is possible to implement the system protection function of heating the battery 11, and it becomes possible to prevent the battery 11 from freezing and to prevent an occurrence of a malfunction in the battery 11.

In this manner, in the vehicle management device of the first embodiment, ID information that defines the condition of use is acquired from the electric vehicle D, and it is determined whether or not the ID information is invalid based on the condition of use of this acquired ID information. Then, when it is determined that this ID information is invalid, rapid charging to the electric vehicle D having the ID information is prohibited, a limit threshold value, which is the upper limit value of the charging power, is set even in the event of charging by normal charging, and normal charging is also prohibited when the battery SOC reaches this limit threshold value. It is thereby possible to impose a certain degree of limitation to the charging of the battery 11. As a result, a user of the electric vehicle D is imposed with certain restrictions on the use of the electric vehicle D and is limited from freely using the vehicle. In addition, since access to the electric vehicle D is not prohibited and charging of the battery 11 is not completely prohibited, it is possible to ensure execution of system protection functions and to prevent adverse effects in the battery 11. Additionally, it is possible to prevent the electric vehicle D from being left unattended and to prevent an overdischarge of the battery 11 due to self-discharge.

In addition, in this first embodiment, if a prescribed limitation is imposed on the charging of the battery 11 of the electric vehicle D and the battery temperature is equal to or less than the lower limit temperature, the external power is used during charging to drive the battery heater 12 to heat the battery 11. Additionally, if rapid charging and normal charging are prohibited, the stored power of the battery 11 is used to drive the battery heater 12 to heat the battery 11, with the charging gun 41 being disconnected and used as a trigger. As a result, it is possible to implement the system protection function of heating the battery 11 without being completely prohibited, and it becomes possible to prevent an occurrence of a malfunction in the battery 11.

Furthermore, in this first embodiment, when rapid charging and normal charging are prohibited the charging prohibition state is displayed on the meter 16 to notify the user of the electric vehicle D of the charging prohibition state. As a result, the user notified of the charging prohibition state can grasp that charging is prohibited and promptly take an action to cancel the charging prohibition state.

In addition, when determining that the acquired ID information is invalid, even if a charging gun 41 is correctly connected to the electric vehicle D, a charging gun connection sound for notifying that a charging gun 41 has been connected is set to non-output. As a result, it is possible to impart discomfort to the user and to notify the user at an early stage that charging to the battery 11 is limited to a certain extent.

If the ID information acquired from the electric vehicle D accompanying a charge start request is valid, the process proceeds from Step S3→Step S20→Step S21 to output a charging gun connection sound and to carry out charging from the external power source 40, as illustrated in FIG. 2A. At this time, charging corresponding to the type of external power source 40 (rapid charging or normal charging) is carried out.

Next, the effects are described. The effects listed below can be obtained using the vehicle management method and vehicle management device according to the first embodiment.

(1) A vehicle management method for managing the electric vehicle D based on vehicle-specific ID information that defines a condition of use is configured such that acquiring vehicle ID information from the electric vehicle; determining whether or not the ID information is invalid based on the condition of use of the acquired ID information, and applying a prescribed limitation to charging of a battery of the electric vehicle having the ID information upon determining that the ID information is invalid. As a result, it is possible to prevent adverse effects in the battery while applying the prescribed limitation on the vehicle, when the set conditions of use fall outside the application range and the use permission of the vehicle becomes invalid.

(2) Upon the applying of the prescribed limitation on the charging of the battery 11 of the electric vehicle D, charging is permitted until a remaining charging amount of the battery 11 (battery SOC) reaches a predetermined threshold value (limit threshold value), and charging is prohibited when the remaining charging amount of the battery 11 (battery SOC) reaches the predetermined threshold value (limit threshold value). Accordingly, the user is limited from freely carrying out charging, and it becomes possible to limit the use of the electric vehicle D to a certain extent.

(3) Charging power from an external power source 40 to the battery 11 (external power) is used to carry out system protection of the battery 11 (drive a battery heater 12) during charging to the battery 11, and the system protection of the battery 11 is stopped (the battery heater 12 is stopped) when the charging becomes prohibited. As a result, it is possible to implement the system protection function of heating the battery 11 even if charging is being limited, and it becomes possible to prevent an occurrence of a malfunction in the battery 11.

(4) When a charging gun 41, which supplies electric power from an external power source 40, is disconnected from the electric vehicle D after the charging becomes prohibited, a stored power of the battery 11 (battery power) is used to carry out system protection of the battery 11 (drive the battery heater 12). As a result, it is possible to implement the system protection function of heating the battery 11 even if charging is being limited, and it becomes possible to prevent an occurrence of a malfunction in the battery 11.

(5) Rapid charging is prohibited if the prescribed limitation is imposed on the charging of the battery 11 of the electric vehicle D. Accordingly, the user is limited from freely carrying out charging, and it becomes possible to limit the use of the electric vehicle D to a certain extent.

(6) If the prescribed limitation is imposed on the charging of the battery 11 of the electric vehicle D, when the charging becomes prohibited the user of the electric vehicle D is notified of the charging prohibition state. As a result, the user can grasp the fact that charging is prohibited and promptly take an action to cancel the state in which charging is limited to a certain extent.

(7) Upon determining that the acquired ID information is invalid, a connection notification sound of a charging gun 41, which supplies electric power from an external power source, is made to differ from the sound emitted when the charging gun 41 is normally connected. As a result, it is possible to impart discomfort to the user and to notify the user at an early stage that charging to the battery 11 is limited to a certain extent.

(8) A vehicle management device comprises an onboard controller (EV main controller 10) for transmitting vehicle-specific ID information that defines a condition of use, and a management server 20 for managing an electric vehicle D based on the received ID information, is configured such that the management server 20 acquires the vehicle ID information from the electric vehicle D, determines whether or not the ID information is invalid based on the condition of use of the ID information acquired, and applies a prescribed limitation to the charging of a battery 11 of the electric vehicle D having the ID information upon determining that the ID information is invalid. As a result, when the use permission of the vehicle becomes invalid it is possible to prevent adverse effects in the battery while applying the prescribed limitation on the vehicle.

The vehicle management method and the vehicle management device of the present invention were described above based on the first embodiment, but specific configurations thereof are not limited to this first embodiment, and various modifications and additions to the design can be made without departing from the scope of the invention in accordance with each claim in the Claims.

In the first embodiment, an example was shown in which management of the electric vehicle D is carried out by means of a management server 20 installed outside the vehicle. However, the electric vehicle D may have a function as a management server that manages the use of the vehicle based on conditions of use that are set in the host vehicle. That is, the electric vehicle D itself may comprises a management server 20 and an EV main controller 10, which is an onboard controller.

In addition, in the first embodiment, an example was shown in which a use period is set as a "condition of use" that is set in the vehicle-specific ID information. The condition may be a condition other than the use period (for example, fees, traveling range, etc.), determined by means of a contract to be signed when renting or leasing the electric vehicle D. In any case, when a so-called breach of contract occurs, such as the conditions of use set in the ID information not being observed, determining that this ID information is invalid, and a prescribed limitation is imposed on the charging of the electric vehicle D.

Additionally, in the first embodiment, an example was shown in which, in order to impose a prescribed limitation on charging, rapid charging is prohibited and an upper limit value of the charging power is set, to prohibit charging when the battery SOC reaches the limit threshold value. However, it may be configured such that, for example, execution of rapid charging is possible, but charging is prohibited when the battery SOC reaches the limit threshold value, regardless of the charging method. In addition, rapid charging may be configured to be prohibited while not setting an upper limit value of the battery SOC.

Figure 3:
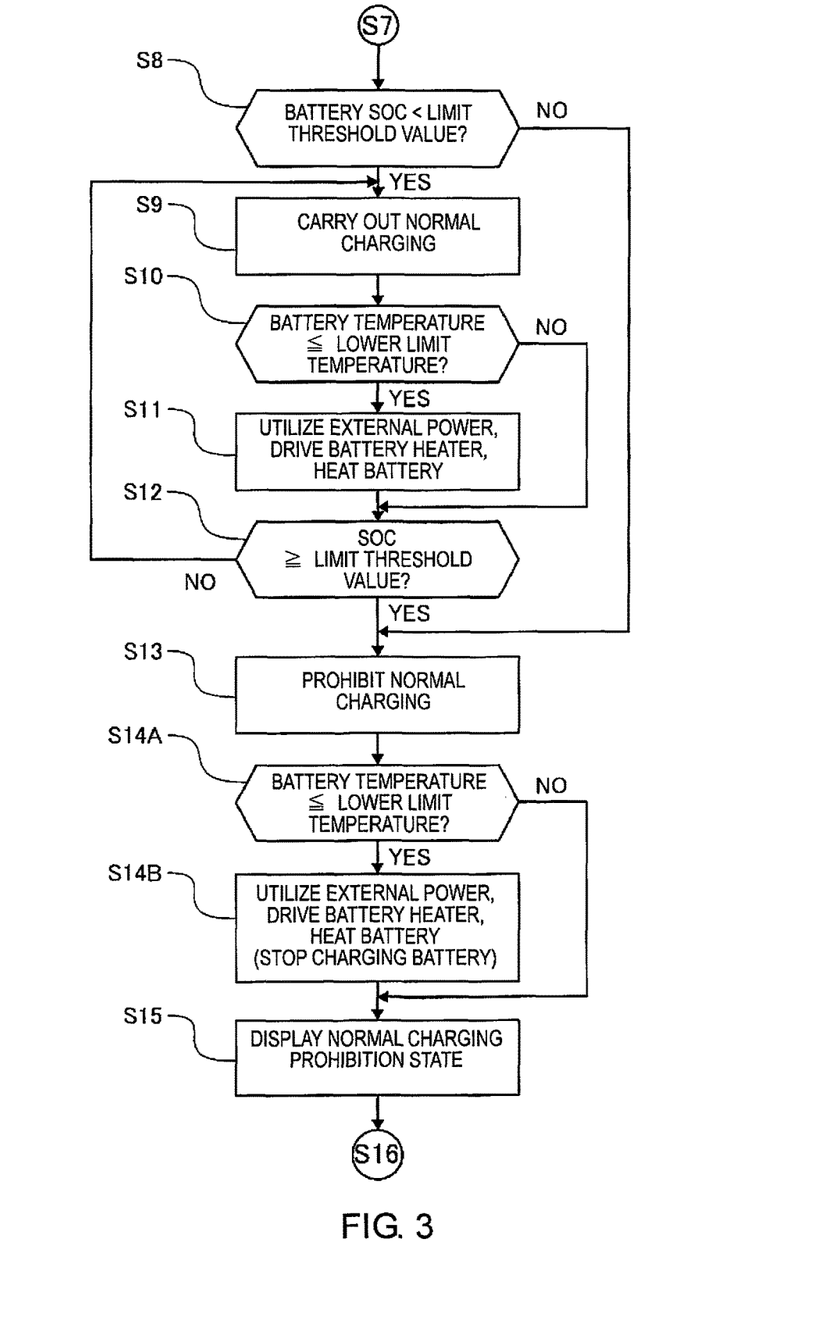
FIG. 3 is an excerpt of a flowchart illustrating the flow of another example of the vehicle management process of the present invention, showing Steps S8-S15.

Furthermore, in the first embodiment, an example was shown in which driving of the battery heater 12 is stopped in the event both rapid charging and normal charging are prohibited, and the battery heater 12 is driven again when the charging gun 41 becomes disconnected. However, for example, the charging to the battery 11 may be stopped when the battery SOC reaches the limit threshold value, whereas the driving of the battery heater 12, using external power is continued while the charging gun 41 is connected to the electric vehicle D. That is, as illustrated by an excerpt of the flowchart for the vehicle management process in FIG. 3, Steps S14A and Steps S14B are executed instead of Step S14 as shown in FIG. 2B. As a result, when the battery SOC is less than the limit threshold value, the battery 11 is charged by the charging power from the external power source 40, while the battery heater 12 is driven using this external power (the flow from Step S8→Step S9→Step S10→Step S11→Step S12). Then, when the battery SOC reaches the limit threshold value, charging of the battery 11 is stopped, while the driving of the battery heater 12 using the external power is continued (the flow from Step S12→Step S13→Step S14A→Step S14B). In this case, while the battery SOC is suppressed to the limit threshold value or lower, it is possible to prevent a decline in the battery temperature and to prevent adverse effects in the battery while applying a prescribed limitation on the use of the vehicle.

Furthermore, in the first embodiment, an example was shown in which, when charging is prohibited, the charging prohibition state is notified by displaying this charging prohibition state on a meter 16 provided in the cabin interior. However, the invention is not limited thereto; for example, the charging prohibition state may be displayed on a mobile phone, personal computer, or other mobile devices possessed by the user of the electric vehicle D. Additionally, the charging prohibition state may be notified by flashing a light on the electric vehicle D or emitting an alarm sound.

Furthermore, in the first embodiment, an example was shown in which, when the ID information is invalid, even if a charging gun 41 is correctly connected, a charging gun connection sound for notifying that the charging gun 41 has been connected is set to non-output, and a sound is not emitted. However, the invention is not limited thereto, and it is sufficient if the user can grasp that charging is limited by being imparted with discomfort when the user tries to carry out charging; therefore, a sound may be emitted that is different from the charging gun connection sound emitted when the charging gun 41 is correctly connected.

The invention claimed is:

1. A vehicle management method for managing an electric vehicle by using a management server based on vehicle-specific ID information that defines a condition of use transmitted from an onboard controller, the vehicle management method comprising:
   acquiring vehicle ID information from the electric vehicle by using the management server;
   determining the vehicle ID information to be valid if the vehicle ID information acquired falls within a use period set in advance and determining the vehicle ID information to be invalid if the vehicle ID information acquired falls outside the use period set in advance; and
   allowing limited charging of a battery of the electric vehicle having the vehicle ID information, using a prescribed limitation on the limited charging of the battery, upon determining that the vehicle ID information is invalid.

2. The vehicle management method according to claim 1, wherein
   upon the allowing limited charging of the battery using the prescribed limitation, charging is permitted until a remaining charging amount of the battery reaches a predetermined threshold value, and charging is prohibited when the remaining charging amount of the battery reaches the predetermined threshold value.

3. The vehicle management method according to claim 2, wherein
   charging power from an external power source to the battery is used to carry out system protection of the battery during charging to the battery, and
   the system protection of the battery is stopped when the charging becomes prohibited.

4. The vehicle management method according to claim 2, wherein
   charging power from an external power source to the battery is used to carry out system protection of the battery during charging to the battery, and
   when the charging becomes prohibited, the charging of the battery is stopped while execution of the system protection of the battery using the external power source is continued.

5. The vehicle management method according to claim 2, wherein
   when a charging gun that supplies electric power from an external power source is disconnected from the electric vehicle after the charging becomes prohibited, a stored power in the battery is used to carry out the system protection of the battery.

6. The vehicle management method according to claim 2, wherein
   if the prescribed limitation is imposed on the charging of the battery of the electric vehicle, when the charging becomes prohibited a user of the electric vehicle is notified of a charging prohibition state.

7. The vehicle management method according to claim 1, wherein
rapid charging is prohibited if the prescribed limitation is imposed on the charging of the battery of the electric vehicle.

8. The vehicle management method according to claim 1, wherein
upon determining that the vehicle ID information acquired is invalid, a connection notification sound of a charging gun that supplies electric power from an external power source is made to differ from the sound emitted when the charging gun is normally connected.

9. A vehicle management device comprising:
an onboard controller for transmitting vehicle-specific ID information that defines a condition of use; and
a management server for managing an electric vehicle based on vehicle ID information received,
the management server being configured to:
acquire the vehicle ID information from the electric vehicle,
determine the vehicle ID information acquired to be valid if the vehicle ID information acquired falls within a use period set in advance and determine the vehicle ID information acquired to be invalid if the vehicle ID information acquired falls outside the use period set in advance, and
allow limited charging of a battery of the electric vehicle having the vehicle ID information, using a prescribed limitation on the limited charging of the battery, upon determining that the vehicle ID information is invalid.

* * * * *